Oct. 17, 1950 M. L. RIGGS 2,526,421
AUTOMATIC TIMING AND RECYCLING APPARATUS
Filed June 10, 1949
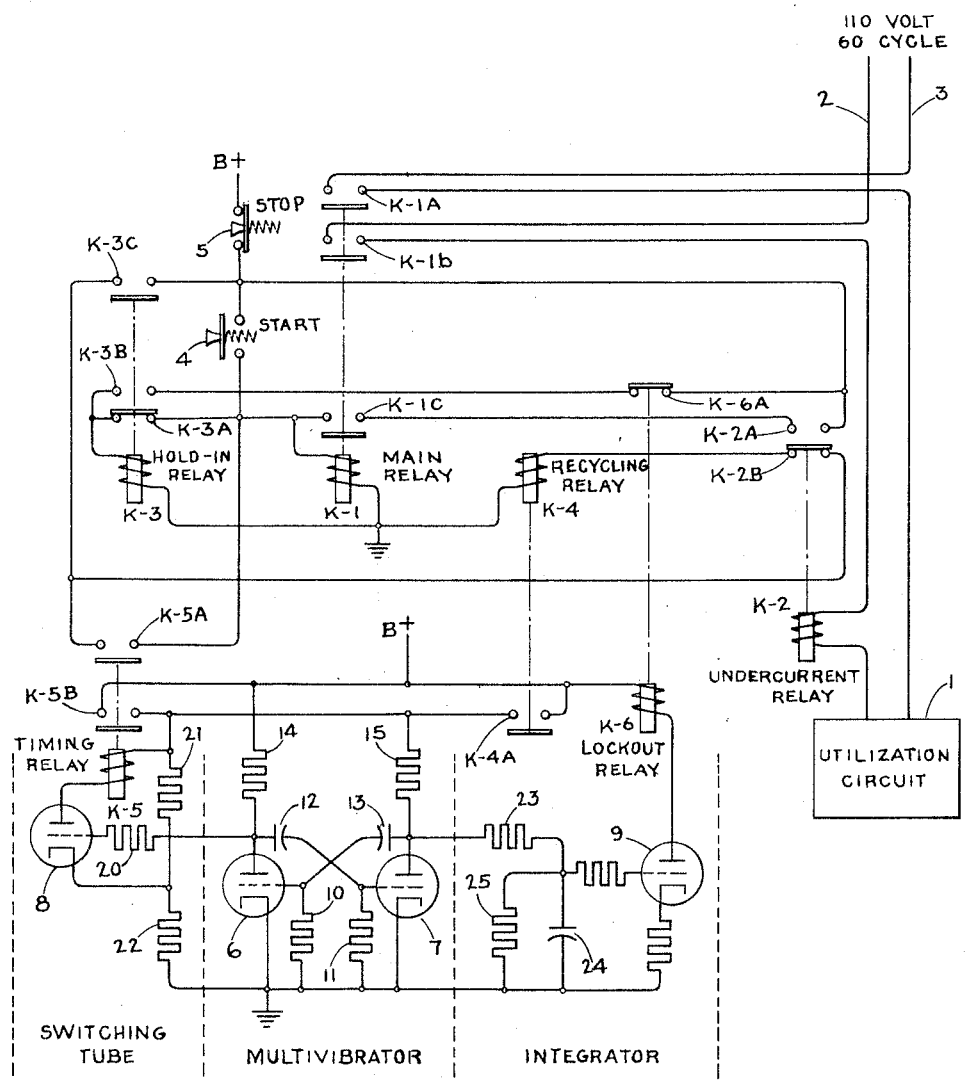
Inventor:
Murray L. Riggs,
by Morton D. Morse
His Attorney.

Patented Oct. 17, 1950

2,526,421

UNITED STATES PATENT OFFICE 2,526,421

AUTOMATIC TIMING AND RECYCLING APPARATUS

Murray L. Riggs, Pittsfield, Mass., assignor to General Electric Company, a corporation of New York Application June 10, 1949, Serial No. 98,241

5 Claims. (Cl. 175—294)

1

This invention relates generally to electrical timing and recycling systems. More particularly, it is concerned with an apparatus for automatically effecting a number of trial closures of a relay contactor and for permanently closing said contactor when predetermined conditions are met, or permanently opening said contactor after a fixed number of trial closures without meeting these conditions.

In the prior art, complex automatic recycling functions have generally been accomplished by systems incorporating mechanical cams and timing motors. Such systems may be perfectly satisfactory at normal room temperature, but rarely operate well at low temperatures. This is due in part to the tendency of lubricants to thicken under such conditions; also ice may form on mechanical parts, thereby disturbing their operating speed and upsetting the timing of the system.

In accordance with my invention, such difficulties, attendant upon the use of mechanical timing devices, are resolved through the use of a multivibrator timing circuit operating in conjunction with relays. Since the repetition rate of a multivibrator is largely independent of temperature and is, in effect, controlled by electrical constants, there is provided thereby an automatic recycling system which is ideally suited for operation under low temperature conditions.

Accordingly, it is an object of my invention to provide a new and improved automatic timing and recycling apparatus which is adapted to operate efficiently at low temperatures.

Another object of my invention is to provide an automatic timing and recycling apparatus which does not require the use of mechanical or electrical timing motors, and which operates solely through electronic circuits in conjunction with relays.

A further object of my invention is to provide an automatic recycling apparatus which will repeatedly close a contactor for short time intervals, until either a predetermined set of conditions have been met in a circuit to which said contactor is connected, or until a predetermined number of closures have been effected.

For further objects and advantages and for a better understanding of the invention, attention is now directed to the following description and accompanying drawing. The features of the invention believed to be novel are more particularly pointed out in the appended claims.

The single figure of the drawing is a schematic diagram of an embodiment of my invention.

2

Referring to the drawing, there is shown a utilization circuit 1 which is connected to a power supply, conventionally represented as 110 volt 60 cycle source. The connection is made through a pair of leads 2 and 3, in which a pair of high current contactors K—1A and K—1B are serially inserted. The purpose of the timing and recycling system is to effect repeated temporary closures of contactors K—1A and K—1B, until predetermined operating conditions are encountered in utilization circuit 1, upon which occurrence, the contactors are to remain permanently closed. In the event that the predetermined operating conditions are not encountered after a certain number of trial closures of the contactors, the recycling operation is to come to an end with the contactors permanently open.

A recycling system of this type finds many possible applications. For instance, it is particularly useful in a radar set for automatically responding to certain operational requirements of magnetrons. When the anode current of a magnetron begins to decrease, after sustained usage, it is usually possible to restore it to its rated value by switching the anode voltage off for a short time interval, and then switching it back on. It may be necessary to repeat this operation a number of times before the magnetron conducts its full rated current. The failure of the magnetron to do so, after a number of trial attempts, is an indication that it is definitely defective, and the anode voltage should be switched off to prevent possible damage to other circuit components. Similarly, upon putting a radar set into operation for the first time with a cold magnetron, the initial application of full anode voltage may not bring the anode current up to its rated value. The same procedure should then be followed, that is, the anode voltage should be switched on and off repeatedly until full anode current is obtained. If this does not occur after a certain number of attempts, the voltage should be permanently switched off to prevent damage to the system.

In an application of the above mentioned type, the predetermined operating conditions which are required to be met are that the current drawn by the utilization circuit exceed a certain value. An under current relay is accordingly inserted in one of the power supply leads to the utilization circuit, and provides suitable signals in the recycling apparatus. It is to be clearly understood, however, that the invention is not restricted to this specific application and many other types of operating conditions may be established as the determining factor by providing suitable measuring and indicating devices to respond to these conditions. For instance, such conditions might be excessively high voltage, excessive current, frequency deviations or any combinations of these and similar factors.

In the embodiment of my invention illustrated in the drawing, it is desired that the recycling circuit operate to re-open contactors K—1A and K—1B when low current conditions are encountered in utilization circuit 1. Accordingly, undercurrent relay K-2 is inserted in lead 2, and this relay provides, through its contacts, K—2A and K—2B, suitable signals in the recycling apparatus.

The recycling apparatus comprises, in addition to the main relay K—1 and the undercurrent relay K—2 which have already been mentioned, a hold-in relay K—3, a recycling relay K—4, a timing relay K—5, and a lock-out relay K—6. The current coils of these relays are energized from a unidirectional voltage source indicated conventionally by B+. However, it is to be understood that alternating current relays may be substituted therefor, where feasible, to operate directly from a standard 110 volt 60 cycle supply. The operation of the recycling apparatus is initiated by pressing a start pushbutton or switch 4, and may be brought to an end at any time by pressing a stop pushbutton 5.

The specific timing circuit comprises a pair of electron discharge devices 6 and 7 connected in a conventional free-running multivibrator circuit. An electron discharge device 8 operates as a switch tube in conjunction with timing relay K—5, and an integrating circuit and an electron discharge device 9 operate, in conjunction with lockout relay K—6, to bring the operation of the apparatus to a stop after a fixed number of trial closures of the main contactors K—1A and K—1B. Since all circuit components are of standard construction and since the connections in the apparatus are clearly shown in the drawing, they will henceforth be considered in the order of their operation as the apparatus goes through a recycling sequence. This will permit the description of the apparatus to be brief while yet remaining complete, and will facilitate understanding its operation.

The apparatus is put into operation by pushing start-switch 4, whereupon operating voltage is applied to the coil of main relay K—1 and to that of hold-in relay K—3 through its normally closed contact K—3A. Relay K—1 thereupon operates to close main contactors K—1A and K—1B, thereby connecting the 110 volt supply to the utilization circuit, and also to close a contact K—1C. The hold-in relay K—3 operates to open normally closed contact K—3A, and to close normally open contacts K—3B and K—3C. The opening of normally closed contact K—3A interrupts the supply of operating voltage to relay K—3 through the start-switch, while the closure of normally open contact K—3B provides a new circuit which permits relay K—3 to remain energized as long as normally closed contact K—6A of the lock-out relay K—6, remains closed.

In the event that sufficient current is drawn by the utilization circuit upon the first closure of contactors K—1A and K—1B, undercurrent relay K—2 operates, causing normally open contact K—2A to close, and normally closed contact K—2B to open. The closure of contact K—2A establishes an alternate path for supplying operating voltage to main relay K—1, which accordingly remains energized and maintains contactors K—1A and K—1B closed. The opening of contact K—2B prevents the energizing of recycling relay K—4 at the present time. The recycling apparatus, having advanced thus far in its sequence of operations, advances no further, but remains in its present state, so that the utilization circuit is permanently energized from the 110 volt supply through contactors K—1A and K—1B. The apparatus is in a position to go into its recycling sequence at any time should the current through undercurrent relay K—2 drop below a predetermined value. It may also be de-energized at any time by pressing stop-switch 5, which opens the operating voltage supply circuit to the coil of main relay K—1, thereby causing contactors K—1A and K—1B to open.

In the event that utilization circuit 1 does not draw sufficient current from the 110 volt supply immediately upon closure of contactors K—1A and K—1B, relay K—2 remains un-energized. Relay K—2 may also become de-energized as a result of the current to the utilization circuit falling below a predetermined level. In such case, the alternate path for supplying operating voltage to the coil of relay K—1 through contact K—2A is not established. Relay K—1 is then immediately de-energized, thereby causing contactors K—1A and K—1B to open and remove the 110 volt supply from utilization circuit 1. Also contact K—2B remains closed, so that recycling relay K—4 is energized, thereby causing contact K—4A in the anode circuit of electron discharge device 7 of the multivibrator to close.

The multivibrator now goes into operation. It will be observed that the anode of device 6 of the multivibrator is at all times connected to the B+ supply so that this device is normally conducting. As a result, when contact K—4A is initially closed, the multivibrator begins its normal operation with device 6 in a conductive state. In accordance with well known principles devices 6 and 7 then proceed to alternate between conducting and non-conducting states, one device becoming conducting when the other becomes non-conducting. It will be observed that both control elecrode discharge resistors 10 and 11 are returned to ground, so that the transitions or alternations from conductance to non-conductance, in either of the discharge devices in both legs of the multivibrator, proceed automatically. This occurs as a result of the regenerative coupling, through capacitors 12 and 13, of the anode of each device to the control electrode of the other. When one device is passing from a conducting to a non-conducting state, it couples a positive increment of voltage to the control electrode of the other device to cause it to pass simultaneously from a non-conducting to a conducting state. Likewise, said other device couples from its anode to the control electrode of the one device, a negative increment of voltage to assist the transition in the one device. These principles are well known in the art and need not to be elaborated any further.

Accordingly, after an interval of time succeeding the closure of contact K—4A, which interval of time is determined by the multivibrator circuit constants comprising control electrode discharge resistors 10 and 11, control electrode coupling capacitors 12 and 13, and anode resistors 14 and 15, device 6 passes from a previously conducting to a non-conducting state. Thereupon, a positive increment of voltage is coupled through a resistor 20 to the control electrode of device 8. The cathode of device 8 is connected to the junction of a pair of resistors 21 and 22 connected between the B+ supply and ground. This connection places a positive bias on the cathode of device 8, such that the voltage normally applied to its control electrode when device 6 is conducting, is insufficient to permit device 8 to conduct. Accordingly, when device 6 passes to a non-conducting state and couples a positive voltage to the control electrode of device 8, anode current flows in device 8 and energizes timing relay K—5. This causes contacts K—5A and K—5B to close, so that main relay K—1 is energized. Accordingly, main contactor K—1A and K—1B close, and utilization circuit 1 remains energized until the multivibrator reverses its states of conduction and device 6 passes from a previously non-conducting to a conducting state. At each and every occurrence of a non-conducting state in device 6, device 8 conducts, timing relay K—5 is energized and accordingly, main relay K—1 operates, and, through its contactors K—1A and K—1B, connects the 110 volt supply to utilization circuit 1.

If, during any one of the repeated closures of contactors K—1A and K—1B, the utilization circuit should draw sufficient current to operate undercurrent relay K—2, normally closed contact K—2B opens, recycling relay K—4 becomes de-energized, contact K—4A opens, and the multivibrator circuit ceases its operation upon the next occurrence of a non-conducting state in device 8. Due to the fact that undercurrent relay K—2 also caused contact K—2A to close, thereby providing an alternate path for the B+ voltage to main relay K—1, when the multivibrator ceases its operation, relay K—1 remains energized and contactors K—1A and K—1B remain closed.

In the event that, during any of the temporary closures of contactors K—1A and K—1B, utilization circuit 1 does not draw sufficient current to energize undercurrent relay K—2, the multivibrator continues to operate. At each and every occurrence of a non-conducting state in device 7, the voltage on the anode thereof attains a high value approximately equal to the B+ supply. This causes a certain amount of charge to flow through resistor 23 to capacitor 24. Elements 23 and 24 are so proportioned that, after the occurrence of a certain number of non-conducting states in device 7, capacitor 24 has charged to a voltage high enough to cause device 9 to conduct and energize lock-out relay K—6. This immediately causes contact K—6A to open and hold-in relay K—3 to become de-energized. This, in turn causes contact K—3C to open, whereupon recycling relay K—4 becomes de-energized, so that all operations come to an end.

The number of trial closures of contactors K—1A and K—1B occurring before the operation of the lockout relay, can be controlled through the choice of resistor 23 and capacitor 24. Thus, increasing the time constant of this combination, increases the number of closures occurring before operation of the lock-out relay. Resistor 25, in parallel with capacitor 24, is for the purpose of permitting capacitor 24 to discharge gradually after the operation of lock-out relay K—6, so that after a suitable interval of time, the recycling apparatus may be put into operation again by pushing start switch 4. The apparatus is thus automatically reset to operate again whenever required. The length of this resetting time interval may readily be controlled through the choice of resistor 25.

When it is desired that the intervals of time during which contactors K—1A and K—1B remain closed, during a trial closure, be equal to the intervals between closures, the components in both legs of the multivibrator are made symmetrically equal. By making these components unequal in both legs, the rate of open to closed time intervals may be varied. Likewise, the actual period between closures can be varied by varying the time-constants of the coupling combinations.

My recycling apparatus provides a timing system in which all operations are determined by electrical constants rather than by mechanical devices. It is accordingly free from the disadvantageous effects of low temperatures on mechanical moving parts. Moreover, it is readily adjustable as to time intervals, recycling speed and resetting time interval and has greater operational flexibility and adaptiveness than recyclying apparatus heretofore available.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. An electrical apparatus for effecting a sequence of repeated operations of an element, said sequence to terminate with said element in an operated state upon the occurrence of certain given conditions in a network controlled thereby, and in a non-operated state upon the non-occurrence of said conditions within a fixed number of operations, comprising a current-responsive device controlling said element, first means for initially energizing said device, an indicator in said network responsive to said conditions, a normally unenergized multivibrator circuit of the free running type, second means linked with said indicator for temporarily de-energizing said device and for simultaneously energizing said multivibrator upon the non-occurrence of said given conditions, said multivibrator repeatedly energizing said device in accordance with the alternations of said multivibrator, an integrating circuit connected to said multivibrator, and third means operating from said integrating circuit to prevent energization of said device after a fixed number of said alternations.

2. An electrical apparatus for effecting a sequence of repeated operations of an element, said sequence to terminate with said element in an operated state upon the occurrence of certain given conditions in a network controlled thereby, and in a non-operated state upon the non-occurrence of said conditions within a fixed number of operations, comprising a current-responsive device controlling said element, first means for initially energizing said device, an indicator in said network responsive to said conditions, a normally unenergized multivibrator circuit, second means linked with said indicator for temporarily de-energizing said device and for simultaneously energizing said multivibrator upon the non-occurrence of said given conditions consequent upon said initial energizing of said device, said multivibrator being of the free-running type having a pair of legs which are alternately conducting and non-conducting, a switching circuit connected to one leg of said multivibrator for repeatedly energizing said device during states of non-conduction in said one leg, an integrating circuit connected to said multivibrator, and third means operating from said integrating circuit to prevent energization of said multivibrator after a fixed number of said alternations.

3. An electrical apparatus for effecting a sequence of repeated operations of an element, said sequence to terminate with said element in an operated state upon the occurrence of certain given conditions in a network controlled thereby, and in a non-operated state upon the non-occurrence of said conditions within a fixed number of operations, comprising a current-responsive device controlling said element, first means for initially energizing said device, an indicator in said network responsive to said conditions, a normally unenergized multivibrator circuit, second means linked with said indicator for temporarily de-energizing said device and for simultaneously energizing said multivibrator upon the non-occurrence of said given conditions consequent upon said initial energizing of said device, said multivibrator being of the free-running type having a pair of electron discharge devices each having an anode which alternates between a low and at a high potential, a first switching circuit operating from one of said anodes for repeatedly energizing said device when said one anode is at a high potential, an integrating circuit comprising a capacitance in series with a resistance connected to the other of said anodes for accumulating a charge proportional to the number of occurrences of high potential states at said other anode, and a second switching circuit operating from said integrating circuit for preventing energization of said device by said switching circuit after said charge attains a predetermined magnitude.

4. An automatic timing and recycling apparatus for effecting a sequence of repeated closures of a contactor for predetermined time durations at predetermined time intervals, said sequence to terminate in a permanent closure upon the encounter of a given set of conditions in a network controlled by said contactor and failing said encounter, in a permanent opening of said contactor after a fixed number of closures, comprising a main relay controlling said contactor, a hold-in relay, push switch means for initially closing both said relays, a holding circuit for keeping said hold-in relay closed after the operation of said means, an auxiliary contact in said main relay, an indicator in said network responsive to said given set of conditions, means controlled by said indicator and operating with said auxiliary contact to maintain said main relay closed when said given set of conditions is encountered, a multivibrator circuit, means operative upon the non-operation of said indicator to put said multivibrator into operation, said multivibrator being of the free-running type having a pair of legs each of which is alternately conducting and non-conducting, means for energizing said main relay during non-conductance in one of said legs, an integrating circuit connected to said multivibrator, and means connected to said integrating circuit for disabling said holding circuit after a fixed number of alternations in said multivibrator.

5. An automatic timing and recycling apparatus for effecting a sequence of repeated closures of a contactor for predetermined time durations at predetermined time intervals, said sequence to terminate in a permanent closure upon the encounter of a given set of conditions in a network controlled by said contactor and, failing said encounter, in a permanent opening of said contactor after a fixed number of closures, comprising a main relay controlling said contactor, a hold-in relay, a circuit including a push switch for momentarily operating both said relays, a first holding circuit for keeping said hold-in relay energized following the operation of said push switch, an auxiliary normally-open contact in said main relay, an indicator in said network responsive to said conditions, a contact operated by said indicator and connected in series with said auxiliary contact in a second holding circuit for keeping said main relay energized when said conditions occur in said network following momentary energizing of said main relay, a multivibrator circuit, a recycling relay linked to said indicator for putting said multivibrator into operation upon the non-operation of said indicator, said multivibrator being of the free-running type in which the anode of the electron discharge device in either leg thereof is alternately at a low and at a high potential, a first switching circuit having an input terminal connected to one of said anodes and operating to repeatedly energize said main relay whenever said one anode is at a high potential, an integrating circuit comprising a capacitance connected, in series with a resistance, to the other of said anodes for accumulating a charge proportional to the number of occurrences of high potential states at said other anode, and a second switching circuit operating from said integrating circuit for disabling said first holding circuit when said charge attains a predetermined magnitude.

MURRAY L. RIGGS.

REFERENCES CITED

The following references are of record in the file of this patent:

UNITED STATES PATENTS

| Number | Name | Date |
|---|---|---|
| 2,473,344 | McCown | June 14, 1949 |